(12) United States Patent
Zhang et al.

(10) Patent No.: US 12,549,421 B2
(45) Date of Patent: Feb. 10, 2026

(54) DATA SENDING METHOD AND APPARATUS, STORAGE MEDIUM, AND ELECTRONIC APPARATUS

(71) Applicant: SANECHIPS TECHNOLOGY CO., LTD., Shenzhen (CN)

(72) Inventors: Dingming Zhang, Shenzhen (CN); Xing Liu, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 458 days.

(21) Appl. No.: 18/023,781

(22) PCT Filed: Aug. 27, 2021

(86) PCT No.: PCT/CN2021/115107
§ 371 (c)(1),
(2) Date: Feb. 28, 2023

(87) PCT Pub. No.: WO2022/042698
PCT Pub. Date: Mar. 3, 2022

(65) Prior Publication Data
US 2024/0243957 A1   Jul. 18, 2024

(30) Foreign Application Priority Data

Aug. 28, 2020 (CN) .......................... 202010888690.4

(51) Int. Cl.
*H04L 27/26* (2006.01)
*H04L 5/00* (2006.01)

(52) U.S. Cl.
CPC .......... *H04L 27/2607* (2013.01); *H04L 5/005* (2013.01)

(58) Field of Classification Search
None
See application file for complete search history.

(56) References Cited

U.S. PATENT DOCUMENTS

| 2012/0033630 A1* | 2/2012 | Chung | ................. H04W 72/23 370/329 |
| 2012/0120905 A1* | 5/2012 | Ko | ........................ H04L 5/0094 370/479 |

(Continued)

FOREIGN PATENT DOCUMENTS

| CN | 101662344 A | 3/2010 |
| CN | 103475445 A | 12/2013 |

(Continued)

OTHER PUBLICATIONS

Japanese Office Action; Application No. 2023-512028; date of mailing: Jun. 3, 2025; 8 pages.

(Continued)

*Primary Examiner* — Diane L Lo
(74) *Attorney, Agent, or Firm* — CANTOR COLBURN LLP

(57) ABSTRACT

The method includes: mapping determined transmission information and physical information about a downlink to N layers in a resource block (RB), so as to obtain N pieces of layer information, wherein N is a natural number greater than or equal to 1; modulating each of the N pieces of layer information to obtain N pieces of layer complex-value information; precoding each of the N pieces of layer complex-value information to obtain N pieces of RB antenna data, wherein the N pieces of RB antenna data are respectively mapped to N antenna ports; and sending the N pieces of RB antenna data.

15 Claims, 4 Drawing Sheets

(56) References Cited

U.S. PATENT DOCUMENTS

2016/0337019 A1* 11/2016 Chung .................. H04W 72/04
2017/0163461 A1    6/2017 Baek et al.

FOREIGN PATENT DOCUMENTS

| CN | 103580843 A | 2/2014 |
| JP | 2018137496 A | 8/2018 |
| JP | 2020521365 A | 7/2020 |

OTHER PUBLICATIONS

European Search Report for corresponding application EP21860530; Mail date Feb. 5, 2024.
Huawei, "Mapping of virtual resource blocks for the Physical Data Shared Channel" TSG RAN WG1 Meeting #49bis Orlando, FL, USA, Jun. 25-29, 2007, R1-072903.
International Search Report for corresponding application PCT/CN2021/115107 filed Aug. 27, 2021; Mail date Nov. 17, 2021.
ETSI TS 136 211 V9.1.0 (Apr. 2010), Evolved Universal Terrestrial Radio Access (E-UTRA); Physical channels and modulation, http://www.etsi.org.
Japanese Office Action; Application No. 2023512028; date of mailing: Nov. 18, 2025; 6 pages.

* cited by examiner

DATA SENDING METHOD AND APPARATUS, STORAGE MEDIUM, AND ELECTRONIC APPARATUS

CROSS-REFERENCE TO RELATED APPLICATION

The present disclosure is a U.S. national phase application based on International Application No. PCT/CN2021/115107, filed on 27 Aug. 2021, which claims the priority of Chinese Patent Application CN202010888690.4, filed on 28 Aug. 2020 and entitled "Data Sending Method and Apparatus, Storage Medium, and Electronic Apparatus", the disclosure of which is incorporated herein by reference in its entirety.

TECHNICAL FIELD

The embodiments of the present disclosure relate to the field of communications, and in particular, to a method and apparatus for sending data, a storage medium and an electronic apparatus.

BACKGROUND

In current long term evolution (LTE) and 5G new radio (NR) wireless communication systems, resource mapping has the characteristics of large amount of data to be processed and low delay; therefore, in the prior art, a hardware accelerator is generally used to process channel mapping. In 4G wireless communication systems, since an antenna port and a bandwidth are limited, resource consumption and delay caused by an operation of channel mapping are not bottlenecks of a whole system design. In 5G communication systems, due to requirements of large-scale array antennas and large-bandwidth data processing, large delay and resource waste may be caused in the operation.

Comparing channel mapping of a 4-user 8-antenna scene of an LTE typical system with channel mapping of a 16-user 64-antenna scene of a 5G typical system, the mapping resource storage of the 5G system is 64/8-8 times of that of the LTE system, and in addition, the bandwidth 100 M of the typical 5G system is five times of that of the bandwidth 20 M of the LTE typical system: therefore, the storage resources consumed herein are 8*5=40 times.

In view of the described technical problem, no effective solution has been proposed in the prior art.

SUMMARY

According to an embodiment of the present disclosure, provided is a method for sending data, including: mapping determined transmission information and physical information about a downlink to N layers in a resource block (RB), so as to obtain N pieces of layer information, wherein N is a natural number greater than or equal to 1: modulating each of the N pieces of layer information to obtain N pieces of layer complex-value information: precoding each of the N pieces of layer complex-value information to obtain N pieces of RB antenna data, wherein the N pieces of RB antenna data are respectively mapped to N antenna ports: and sending the N pieces of RB antenna data.

According to another embodiment of the present disclosure, provided is an apparatus for sending data, including: a first mapping module, configured to map determined transmission information and physical information about a downlink to N layers in a resource block (RB), so as to obtain N pieces of layer information, wherein N is a natural number greater than or equal to 1: a first modulation module, configured to modulate each of the N pieces of layer information to obtain N pieces of layer complex-value information: a first coding module, configured to precode each of the N pieces of layer complex-value information to obtain N pieces of RB antenna data, wherein the N pieces of RB antenna data are respectively mapped to N antenna ports: and a first sending module, configured to send the N pieces of RB antenna data.

According to another embodiment of the present disclosure, further provided is a computer readable storage medium. The computer readable storage medium stores a computer program, wherein the computer program is configured to execute, when running, the steps in any one of the described method embodiments.

According to another embodiment of the present disclosure, further provided is an electronic apparatus, including a memory and a processor, wherein the memory stores a computer program, and the processor is configured to run the computer program to execute the steps in any one of the method embodiments.

DETAILED DESCRIPTION OF THE EMBODIMENTS

The embodiments of the present disclosure are described in detail with reference to the accompanying drawings and in conjunction with the embodiments.

It should be noted that the terms "first", "second" etc. in the description, claims, and accompanying drawings of the present disclosure are used to distinguish similar objects, and are not necessarily used to describe a specific sequence or order.

Figure 1:
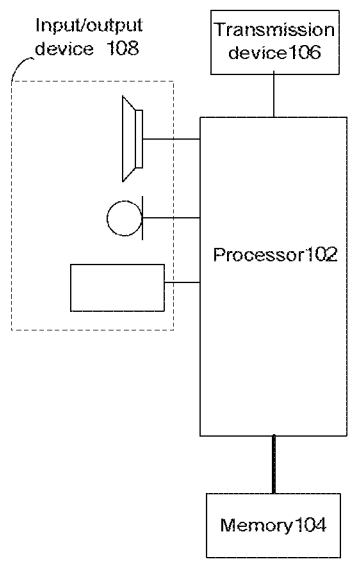
FIG. 1 is a hardware structure block diagram of a mobile terminal of a method for sending data according to an embodiment of the present disclosure.

The method embodiments provided in the present disclosure may be executed in a mobile terminal, a computer terminal, or a similar computing device. Taking running in the mobile terminal as an example, FIG. 1 is a hardware structure block diagram of a mobile terminal performing a method for sending data according to an embodiment of the present disclosure. As shown in FIG. 1, the mobile terminal may include one or more (only one is shown in FIG. 1) processors 102 (the processors 102 may include, but are not limited to, a microprocessor MCU or a processing device such as a programmable logic device FPGA) and a memory 104 configured to store data, wherein the mobile terminal can further include a transmission device 106 for a communication function and an input/output device 108. Those ordinarily skilled in the art can appreciate that the structure shown in FIG. 1 is for illustrative purposes only, but not limit the structure of the mobile terminal. For example, the mobile terminal may also include more or fewer components than that shown in FIG. 1, or have a different configuration than that shown in FIG. 1.

The memory 104 may be configured to store a computer program, for example, a software program and a module of application software, such as a computer program corresponding to the sending data method in the embodiments of the present disclosure. The processor 102 runs the computer program stored in the memory 104, so as to execute various function applications and data processing, that is, to implement the foregoing method. The memory 104 may include a high-speed random access memory, and may also include a non-transitory memory, such as one or more magnetic storage apparatuses, flash memories, or other non-transitory solid-state memories. In some instances, the memory 104 may further include a memory remotely located from the processor 102, and the remote memory may be connected to the mobile terminal by a network. Examples of the described network include, but are not limited to, the Internet, an intranet, a local area network, a mobile communication network, and a combination thereof.

The transmission device 106 is configured to receive or transmit data by a network. Specific examples of the network may include a wireless network provided by a communication provider of the mobile terminal. In one example, the transmission device 106 includes a network interface controller (NIC) which may be connected to other network devices by means of a base station, thereby being able to communicate with the Internet. In one example, the transmission device 106 may be a radio frequency (RF) module for communicating wirelessly with the Internet.

Figure 2:
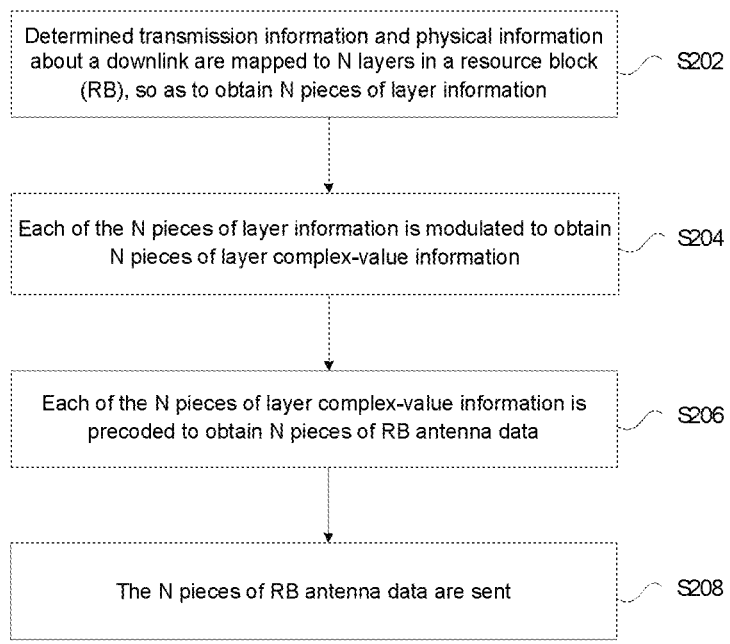
FIG. 2 is a flowchart of a method for sending data according to an embodiment of the present disclosure.

The present embodiment provides a method for sending data. FIG. 2 is a flowchart of a method for sending data according to an embodiment of the present disclosure. As shown in FIG. 2, the method includes the following steps:

step S202, determined transmission information and physical information about a downlink are mapped to N layers in a resource block (RB), so as to obtain N pieces of layer information, wherein N is a natural number greater than or equal to 1;

step S204: each of the N pieces of layer information is modulated to obtain N pieces of layer complex-value information;

step S206: each of the N pieces of layer complex-value information is precoded to obtain N pieces of RB antenna data, wherein the N pieces of RB antenna data are respectively mapped to N antenna ports: and step S208: the N pieces of RB antenna data are sent.

Figure 3:
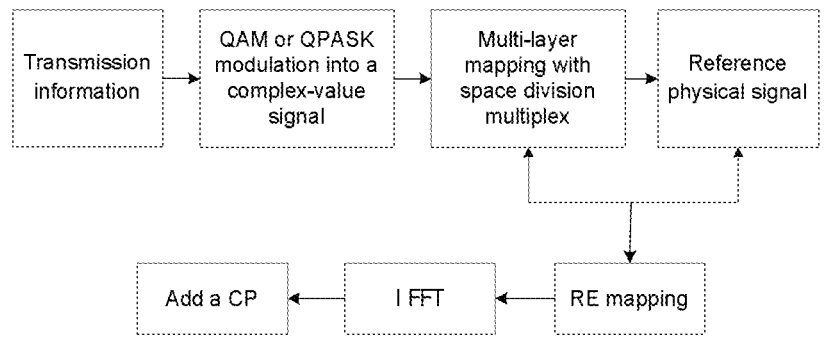
FIG. 3 is a schematic diagram of a downlink information transmission process according to an embodiment of the present disclosure.
Figure 4:
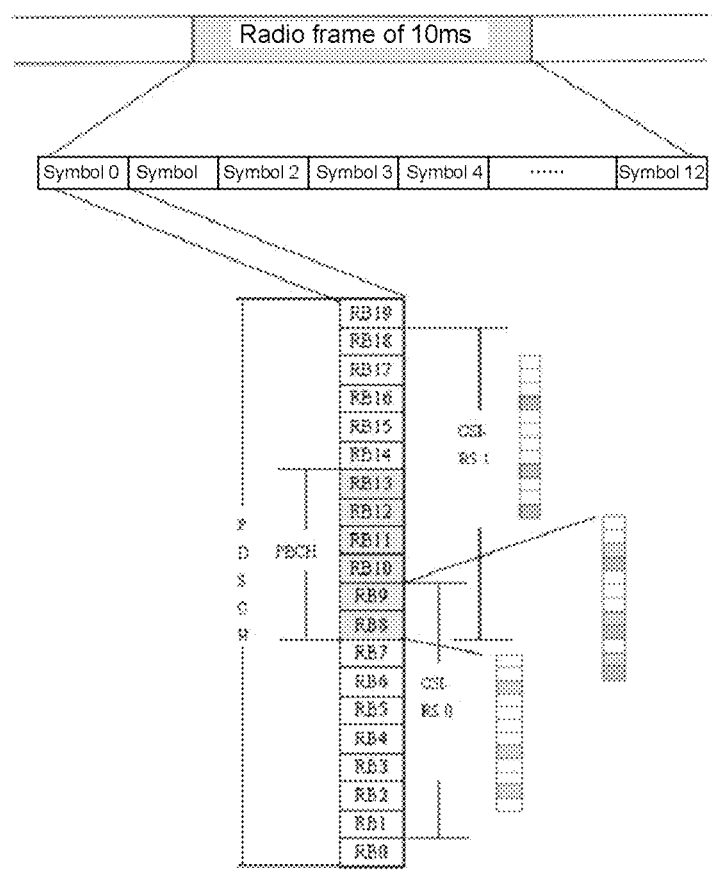
FIG. 4 is a schematic structural diagram of a channel mapping manner according to an embodiment of the present disclosure.

In the present embodiment, downlink information transmission uses an orthogonal frequency division multiplexing manner (OFDM), and resource allocation and scheduling can be flexibly performed in a frequency domain, and an information transmission process of a downlink is as shown in FIG. 3. The involved resources include a physical downlink control channel (PDCCH), a physical downlink shared channel (PDSCH), a single side band (SSB), etc., and various reference signals (RS). Channel mapping is to map various information from different channels to the frequency-domain transmission bandwidth for transmission. FIG. 4 shows a channel mapping manner.

In an exemplary embodiment, the transmission information and the physical information are stored in a first buffer. The channel mapping of each RB is preset by software according to an antenna port resource element (RE). After the RB channel mapping is completed, precoding processing is performed, and the precoding here needs to distinguish transmission information from physical information.

An execution subject of the described steps may be, but is not limited, a base station and the like.

By means of the above steps, determined transmission information and physical information about a downlink are mapped to N layers in a resource block (RB), so as to obtain N pieces of layer information, wherein N is a natural number greater than or equal to 1: each of the N pieces of layer information is modulated to obtain N pieces of layer complex-value information: each of the N pieces of layer complex-value information is precoded to obtain N pieces of RB antenna data, wherein the N pieces of RB antenna data are respectively mapped to N antenna ports: and the N pieces of RB antenna data are sent, resource mapping in units of RBs may be implemented. Therefore, the problem in the related art of large consumption of resources for information processing can be solved, and the effects of reducing the implementation cost and enhancing the real-time property of resource mapping processing can be achieved.

In an exemplary embodiment, the step of mapping the determined transmission information and physical information about a downlink to N layers in a resource block (RB) to obtain N pieces of layer information includes the following step of:

mapping the transmission information and the physical information to the N layers in the RB by way of patterned mapping to obtain the N pieces of layer information, wherein the patterned mapping is used to insert the physical information into the transmission information.

In the present embodiment, the physical information and the transmission information may be mapped according to a mapping pattern of each RB, so as to obtain data of various layers of the whole RB.

In an exemplary embodiment, the step of modulating the N pieces of layer information to obtain N pieces of layer complex-value information includes the following step of:

modulating the transmission information and the physical information in each of the N pieces of layer information to obtain the N pieces of layer complex-value information.

In the present embodiment, the transmission information and physical information of various layers are modulated respectively to obtain complex-value information mapped on to various layers.

In an exemplary embodiment, before the determined transmission information and physical information about a downlink are mapped to N layers in a resource block (RB), so as to obtain N pieces of layer information, the method further includes the following step of:

reading, in the case of determining that the RB is intended for information mapping, the buffered transmission information and physical information.

In the present embodiment, it is determined whether an RB is intended for information mapping (or, information mapping is intended for an RB), and if no information mapping is intended, it is a null RB, and jump to the next RB: if information mapping is intended for the RB, the transmission information and the physical information are read from the first buffer respectively according to mapping patterns of the transmission information and the physical information.

In an exemplary embodiment, after each of the N pieces of layer complex-value information is precoded to obtain N pieces of RB antenna data, the method further includes the following step of:

storing the N pieces of RB antenna data in a ping-pong buffer manner.

In the present embodiment, by using a ping-pong buffer manner, only data of two RBs at multiple layers needs to be stored, thereby significantly reducing storage resources. In addition, after precoded data is obtained, OFDM signal generation is directly performed, which reduces processing time and improves the real-time performance of processing.

In an exemplary embodiment, the step of sending the N pieces of RB antenna data includes the following steps of:

performing an inverse fast Fourier transform on each of the N pieces of RB antenna data to obtain N pieces of time-domain data each corresponding to one of antenna ports;

setting a cyclic prefix (CP) in each of the N pieces of time-domain data to obtain N pieces of CP data: and sending the N pieces of CP data through an air interface.

In the present embodiment, an IFFT is performed on precoded data of each antenna port, to obtain N pieces of time-domain data of each antenna port: a CP is added to the obtained time-domain data, and then it is transmitted through an air interface.

The present disclosure will be further described below in conjunction with specific embodiments.

Figure 6:
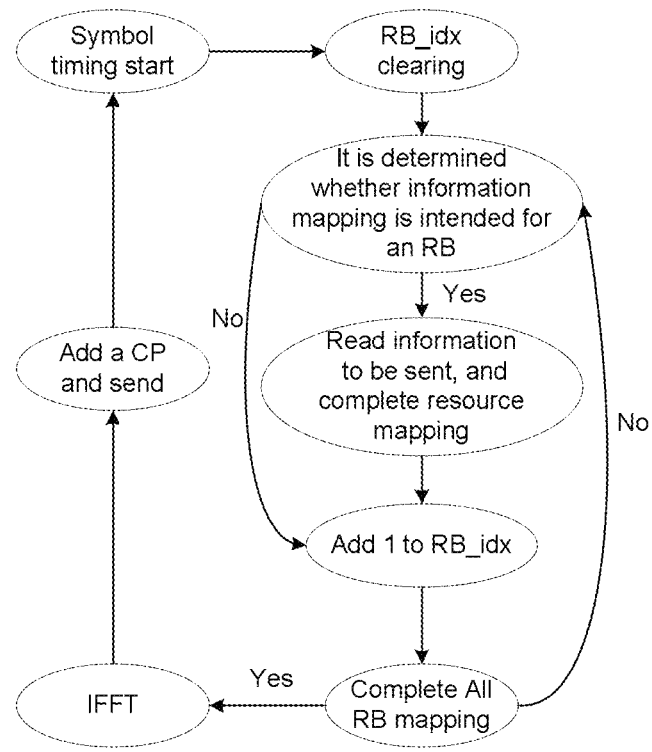
FIG. 6 is a schematic diagram of a scenario of frequency-domain symbol processing according to an embodiment of the present disclosure.
Figure 7:
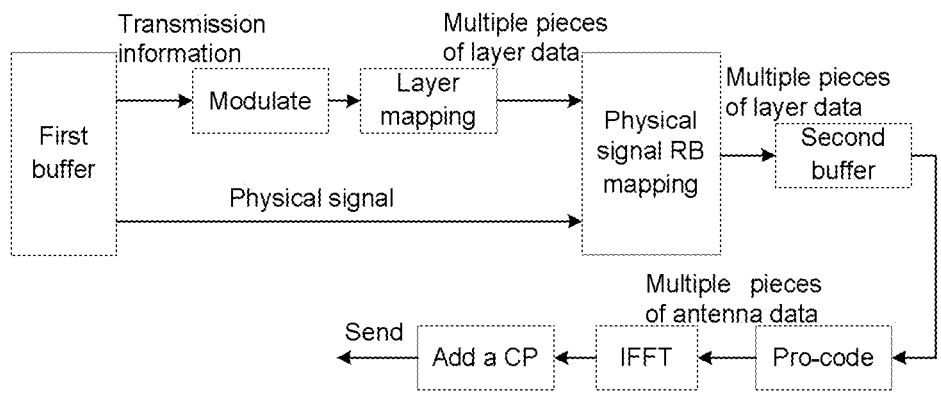
FIG. 7 is a processing flowchart of channel mapping according to an embodiment of the present disclosure.

The resource mapping method in the present embodiments is applied to scenarios including, but not limited to, processing a frequency-domain symbol, as shown in FIG. 6. As shown in FIG. 7, the channel mapping processing steps include the following steps.

S1, system synchronization is performed, and after symbol timing is started, an RB_indexidx is cleared;

S2, it is determined whether information mapping is intended for an RB, if no information mapping is intended, then it is a null RB, and then jump to the next RB: if information mapping is intended for the RB, the transmission information and the physical information from the first buffer are read respectively according to mapping patterns of the transmission information and the physical information;

S3, multilayer mapping of the transmission information is completed according to the configuration information about the RB: patterned mapping of the transmission information and the physical information, after being respectively modulated, are completed according to a mapping pattern of the RB: the mapped RB data is written into a second buffer, wherein the second buffer is in a ping-pong storage manner;

S4, the RB data of layers after patterned mapping is read from the second buffer, precoding is performed, and the data of the RB for the antenna port is obtained;

S5, S2 and S4 are repeated until the channel mapping of all RBs of the OFDM symbol is completed;

S6, IFFT is performed on RBs for each antenna port that have been subjected to channel mapping, so as to obtain time-domain signals;

S7, after an operation of adding the CP to the time-domain signal is performed, the time-domain signal is sent through an air interface: data mapping of one symbol is completed.

Figure 5:
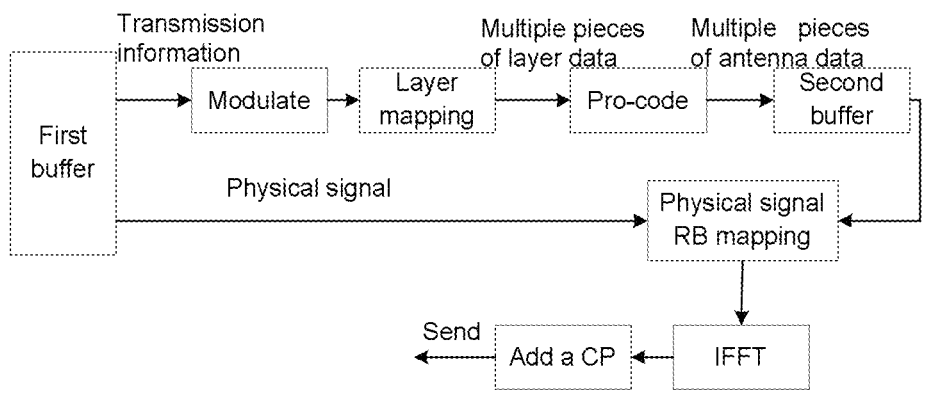
FIG. 5 is a schematic diagram of a mapping manner for configuring a symbol frequency-domain RB channel by software according to an embodiment of the present disclosure.

In summary; compared with the prior art, in the present disclosure, one OFDM symbol is treated as a processing unit, and the mapping manner for a frequency-domain RB channel of the symbol is configured by software (as shown in FIG. 5). In the present embodiment, an RB is taken as a processing granularity, transmission information for each RB in a first buffer is read: after layer mapping is completed, modulation processing is performed so as to obtain complex-value data of the RB on each layer: channel mapping of the RB is completed taking one layer as a unit so as to insert a physical signal into the transmission information by way of patterned mapping: after respectively precoding the transmission information data and the physical signal of the RB, data of the RB on each antenna port is obtained: IFFT is performed on the data of the antenna port to generate a time-domain signal, and after the operation of adding a CP is completed, it is sent through an air interface. On the one hand, storage resources are saved and implementation costs are reduced, and on the other hand, the real-time performance of resource mapping processing is increased. The channel mapping manner per RB can be configured by software, thereby improving the application flexibility of the device.

From the description of the described embodiments, a person skilled in the art would have been able to clearly understand that the method in the described embodiments may be implemented by using software and necessary general hardware platforms, and of course may also be implemented using hardware, but in many cases, the former is a better embodiment. Based on such understanding, the essence of technical solution of the embodiments of the present disclosure, or in other words, the part of the technical solutions making contributions to the prior art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

The present embodiment further provides an apparatus for sending data, which is used for implementing the described embodiments and preferred embodiments, and what has been described will not be repeated again. As used below; the term "module" may implement a combination of software and/or hardware of predetermined functions. Although the apparatus described in the following embodiments is preferably implemented in software, implementation in hardware or a combination of software and hardware is also possible and conceived.

Figure 8:
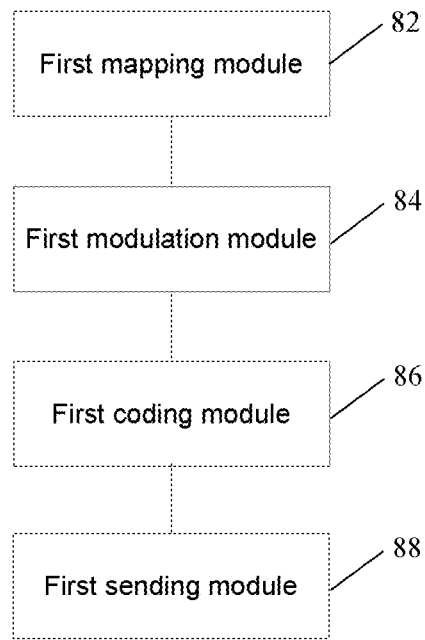
FIG. 8 is a structural block diagram of an apparatus for sending data according to an embodiment of the present disclosure.

FIG. 8 is a structural block diagram of an apparatus for sending data according to an embodiment of the present disclosure. As shown in FIG. 8, the apparatus includes a first mapping module 82, a first modulation module 84, a first coding module 86 and a first sending module 88. The device is described as follows:

the first mapping module 82 is configured to map the determined transmission information and physical information about a downlink to N layers in a resource block (RB), so as to obtain N pieces of layer information, wherein N is a natural number greater than or equal to 1;

the first modulation module 84 is configured to modulate each of the N pieces of layer information to obtain N pieces of layer complex-value information;

the first coding module 86 is configured to precode each of the N pieces of layer complex-value information to obtain N pieces of RB antenna data, wherein the N pieces of RB antenna data are respectively mapped to N antenna ports: and the first sending module 88 is configured to send the N pieces of RB antenna data.

In an exemplary embodiment, the first mapping module includes: a first determination unit, configured to map determined transmission information and physical information about a downlink to N layers in a resource block (RB), so as to obtain N pieces of layer information: and a second determination unit, configured to map, by way of patterned mapping, the transmission information and the physical information to the N layers in the RB to obtain the N pieces of layer information, wherein the patterned mapping is used to insert the physical information into the transmission information.

In an exemplary embodiment, the first modulation module includes: a first modulation unit, configured to modulate the transmission information and the physical information in each of the N pieces of layer information, to obtain the N pieces of layer complex-value information.

In an exemplary embodiment, the device further includes: a reading module, configured to read, before determined transmission information and physical information about a downlink are mapped to N layers in a resource block (RB), so as to obtain N pieces of layer information, in case of determining that the RB is intended for information mapping, the buffered transmission information and physical information.

In an exemplary embodiment, the device further includes: a buffer module, configured to buffer the N pieces of RB antenna data in a ping-pong buffer manner after each of the N pieces of layer complex-value information is precoded to obtain N pieces of RB antenna data.

In an exemplary embodiment, the first sending module is configured to send the N pieces of RB antenna data, and includes: a first determination module, configured to perform an inverse fast Fourier transform on each of the N pieces of RB antenna data to obtain N pieces of time-domain data each corresponding to one of antenna ports: a second determination module, configured to set a cyclic prefix (CP) in each of the N pieces of time-domain data, so as to obtain N pieces of CP data; and a first sending module, configured to send the N pieces of CP data through an air interface.

It should be noted that the modules above may be implemented by software or hardware, and the latter may be implemented in the following manner, but is not limited thereto. All the modules above are located in the same processor: or all the modules above are located in different processors in any arbitrary combination manner.

The embodiments of the present disclosure further provide a computer readable storage medium storing a computer program, wherein the computer program is configured to execute, when running, the steps in any one of the described method embodiments.

In an exemplary embodiment, the computer readable storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure further provide an electronic apparatus, including a memory and a processor: the memory stores a computer program, and the processor is configured to run the computer program, so as to execute the steps in any one of the method embodiments.

In an exemplary embodiment, the electronic apparatus can further include a transmission device and an input/output device, wherein the transmission device is connected to the processor, and the input/output device is connected to the processor.

For specific examples in the present embodiment, reference can be made to the examples described in the described embodiments and exemplary embodiments, and thus they will not be repeated again in the present embodiment.

It is apparent that a person skilled in the art shall understand that all of the above-mentioned modules or steps in the present disclosure may be implemented by using a general computation apparatus, may be centralized on a single computation apparatus or may be distributed on a network composed of multiple computation apparatuses, they may be implemented by using executable program codes of the computation apparatuses. Thus, they may be stored in a storage apparatus and executed by the computation apparatuses, the shown or described steps may be executed in a sequence different from this sequence under certain conditions, or they are manufactured into each integrated circuit module respectively, or multiple modules or steps therein are manufactured into a single integrated circuit module. Thus, the present disclosure is not limited to any specific hardware and software combinations.

The content above only relates to preferred embodiments of the present disclosure, and is not intended to limit the present disclosure. For a person skilled in the art, the present disclosure may have various modifications and changes. Any modifications, equivalent replacements, improvements, etc. made within the principle of the present disclosure shall all fall within the scope of protection of the present disclosure.

What is claimed is:

1. A method for sending data, comprising:
    mapping determined transmission information and physical information about a downlink to N layers in a resource block (RB), so as to obtain N pieces of layer information, wherein N is a natural number greater than or equal to 1;
    modulating each of the N pieces of layer information to obtain N pieces of layer complex-value information;
    precoding each of the N pieces of layer complex-value information to obtain N pieces of RB antenna data, wherein the N pieces of RB antenna data are respectively mapped to N antenna ports;
    buffering the N pieces of RB antenna data in a ping-pong buffer manner; and
    sending the N pieces of RB antenna data.

2. The method according to claim 1, wherein mapping determined transmission information and physical information about a downlink to N layers in a resource block (RB), so as to obtain N pieces of layer information comprises:
    mapping, by way of patterned mapping, the transmission information and the physical information to the N layers in the RB to obtain the N pieces of layer information, wherein the patterned mapping is used to insert the physical information into the transmission information.

3. The method according to claim 1, wherein modulating the N pieces of layer information to obtain N pieces of layer complex-value information comprises:

modulating transmission information and physical information in each of the N pieces of layer information, to obtain the N pieces of layer complex-value information.

4. The method according to claim 1, wherein before mapping determined transmission information and physical information about a downlink to N layers in a resource block (RB), so as to obtain N pieces of layer information, the method further comprises:
reading, in a case of determining that the RB is intended for information mapping, the buffered transmission information and physical information.

5. The method according to claim 1, wherein sending the N pieces of RB antenna data comprises:
performing an inverse fast Fourier transform on each of the N pieces of RB antenna data to obtain N pieces of time-domain data each corresponding to one of antenna ports;
setting a cyclic prefix (CP) in each of the N pieces of time-domain data, so as to obtain N pieces of CP data; and
sending the N pieces of CP data through an air interface.

6. A non-transitory computer readable storage medium storing a computer program, wherein the computer program is configured to facilitate, when running, to execution of the following steps of:
mapping determined transmission information and physical information about a downlink to N layers in a resource block (RB), so as to obtain N pieces of layer information, wherein N is a natural number greater than or equal to 1;
modulating each of the N pieces of layer information to obtain N pieces of layer complex-value information;
precoding each of the N pieces of layer complex-value information to obtain N pieces of RB antenna data, wherein the N pieces of RB antenna data are respectively mapped to N antenna ports;
buffering the N pieces of RB antenna data in a ping-pong buffer manner; and
sending the N pieces of RB antenna data.

7. The non-transitory computer readable storage medium according to claim 6, wherein the computer program is further configured to facilitate, when running, to execution of the following step of:
mapping, by way of patterned mapping, the transmission information and the physical information to the N layers in the RB to obtain the N pieces of layer information, wherein the patterned mapping is used to insert the physical information into the transmission information.

8. The non-transitory computer readable storage medium according to claim 6, wherein the computer program is further configured to facilitate, when running, to execution of the following step of:
modulating transmission information and physical information in each of the N pieces of layer information, to obtain the N pieces of layer complex-value information.

9. The non-transitory computer readable storage medium according to claim 6, wherein the computer program is further configured to facilitate, when running, to execution of the following step of:
reading, in a case of determining that the RB is intended for information mapping, the buffered transmission information and physical information.

10. The non-transitory computer readable storage medium according to claim 6, wherein the computer program is further configured to facilitate, when running, to execution of the following steps of:
performing an inverse fast Fourier transform on each of the N pieces of RB antenna data to obtain N pieces of time-domain data each corresponding to one of antenna ports;
setting a cyclic prefix (CP) in each of the N pieces of time-domain data, so as to obtain N pieces of CP data; and
sending the N pieces of CP data through an air interface.

11. An electronic device, comprising a memory and a processor, wherein the memory stores a computer program, and the processor is configured to run the computer program so as to execute the following steps of:
mapping determined transmission information and physical information about a downlink to N layers in a resource block (RB), so as to obtain N pieces of layer information, wherein N is a natural number greater than or equal to 1;
modulating each of the N pieces of layer information to obtain N pieces of layer complex-value information;
precoding each of the N pieces of layer complex-value information to obtain N pieces of RB antenna data, wherein the N pieces of RB antenna data are respectively mapped to N antenna ports;
buffering the N pieces of RB antenna data in a ping-pong buffer manner; and
sending the N pieces of RB antenna data.

12. The electronic device according to claim 11, wherein the processor is further configured to run the computer program to execute the following step of:
mapping, by way of patterned mapping, the transmission information and the physical information to the N layers in the RB to obtain the N pieces of layer information, wherein the patterned mapping is used to insert the physical information into the transmission information.

13. The electronic device according to claim 11, wherein the processor is further configured to run the computer program to execute the following step of:
modulating transmission information and physical information in each of the N pieces of layer information, to obtain the N pieces of layer complex-value information.

14. The electronic device according to claim 11, wherein the processor is further configured to run the computer program to execute the following step of:
reading, in a case of determining that the RB is intended for information mapping, the buffered transmission information and physical information.

15. The electronic device according to claim 11, wherein the processor is further configured to run the computer program to execute the following steps of:
performing an inverse fast Fourier transform on each of the N pieces of RB antenna data to obtain N pieces of time-domain data each corresponding to one of antenna ports;
setting a cyclic prefix (CP) in each of the N pieces of time-domain data, so as to obtain N pieces of CP data; and
sending the N pieces of CP data through an air interface.

* * * * *